(12) United States Patent  (10) Patent No.: US 8,194,192 B2
Harada et al.  (45) Date of Patent: Jun. 5, 2012

(54) PROJECTION DISPLAY

(75) Inventors: Shigeki Harada, Tokyo (JP); Takayoshi Nagai, Tokyo (JP); Ikuro Suga, Tokyo (JP); Akihiko Iwata, Tokyo (JP); Yoshiteru Suzuki, Tokyo (JP); Akira Okumura, Tokyo (JP); Jun Someya, Tokyo (JP); Kuniko Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1269 days.

(21) Appl. No.: 11/761,781

(22) Filed: Jun. 12, 2007

(65) Prior Publication Data

US 2008/0136977 A1  Jun. 12, 2008

(30) Foreign Application Priority Data

Dec. 6, 2006 (JP) ................... 2006-329456
Dec. 6, 2006 (JP) ................... 2006-329457

(51) Int. Cl.
*H04N 9/12* (2006.01)
(52) U.S. Cl. .................. 348/743; 348/771; 348/759
(58) Field of Classification Search .................. 348/739, 348/742–745, 761–790
See application file for complete search history.

(56) References Cited

U.S. PATENT DOCUMENTS 5,917,558 A * 6/1999 Stanton ................ 348/743
7,384,150 B2 * 6/2008 Prince ................... 353/31

FOREIGN PATENT DOCUMENTS

JP 2003-102030 4/2003
JP 2004-302254 10/2004
JP 2005-094272 4/2005

* cited by examiner

*Primary Examiner* — Michael Lee
(74) *Attorney, Agent, or Firm* — Oblon, Spivak, McClelland, Maier & Neustadt, L.L.P.

(57) ABSTRACT

A projection display uses a light modulating device to modulate, in accordance with image data, light radiated from a light source, project the modulated light onto a screen, and display an image. The projection display separates a unit of time configuring the image data into an effective light time when the light modulating device can express the light as an image on the screen and an ineffective light time when the light modulating device cannot express the light as an image on the screen. The projection display increases the power supplied to the light source during the effective light time over the power supplied to the light source during the ineffective light time.

5 Claims, 14 Drawing Sheets

PROJECTION DISPLAY

BACKGROUND OF THE INVENTION

1. Field of the Invention

The present invention relates to a projection display that uses a light modulating device.

2. Description of the Related Art

There are projection displays that use a light modulating device such as a liquid crystal display (LCD) or a digital micromirror device (DMD) to modulate, in accordance with image data, light radiated from a light source, project the modulated light onto a screen, and display an image.

For example, a projection display using a DMD such as described in JP-A No. 2003-102030 expresses shades of gray of image information by switching the inclination of the mirrors of the DMD—that is, the reflectance on the screen— in accordance with the image information. The reflectance of the DMD on the screen takes two values: an ON state where the mirrors reflect light onto the screen and an OFF state where the mirrors do not reflect light onto the screen. The light projected onto the screen in the ON state becomes the maximum luminance that can be expressed as an image. In the OFF state, ideally light does not reach the screen if the reflectance is zero, but in actuality some light reaches the screen even in the OFF state. This becomes the minimum luminance that can be expressed on the screen. In projection displays at present, the maximum luminance and the contrast ratio that is the ratio between the maximum luminance and the minimum luminance are both definitely not sufficient in terms of display performance, and projection displays that have a larger maximum luminance and a larger contrast ratio are desired.

In order to raise the maximum luminance, there is a method that increases the amount of light of the light source, but when the amount of light of the light source is increased, the maximum luminance rises but the minimum luminance also rises at the same time, so the contrast ratio is not improved. Further, the power consumption of the light source also becomes larger and, as a result, there is the problem that the lifespan of the light source becomes shorter. Thus, simply increasing the amount of light of the light source is not a good solution.

In regard to the contrast ratio, as described in JP-A No. 5-66501, for example, there is a method that improves the contrast ratio by adjusting the amount of light inputted to the light modulating device. That is, the method improves the contrast ratio by raising the maximum luminance by increasing the amount of light inputted to the light modulating device when the screen is to be bright, and conversely lowering the minimum luminance by decreasing the amount of light inputted to the light modulating device when the screen is to be dark.

Further, as described in JP-A No. 2002-107662, there is a method where an iris diaphragm is interposed between the light source and the light modulating device. An iris diaphragm changes the light transmission amount by mechanically changing the size of the aperture to change the area through which light passes. An iris diaphragm has the advantage that it is capable of dimming about 25 to 100% so its dimming range is relatively wide. However, the increase in cost resulting from the iris diaphragm and a motor for driving the iris diaphragm has become a large problem. Further, although this method should be capable of dimming 0 to 100% because it mechanically adjusts the aperture, uniformity in the luminance on the screen becomes poor when the area through which the light passes becomes equal to or less than a certain value, so there has been an inherent limit on the dimming range.

Moreover, in projection displays of this type, a high intensity discharge (HID) lamp such as a metal halide lamp or an ultra high pressure mercury lamp is usually used as the light source. Tungsten is used for the electrodes in an HID lamp, and it is well known that a halogen cycle is utilized in order to alleviate wear of the tungsten resulting from the heat of arc discharge.

A halogen cycle is the circulation cycle of an appropriate amount of halogen gas entrapped inside the bulb of an HID lamp. Now, when the temperature of the arc spot of the tungsten electrodes exceeds the sublimation heat of tungsten, the tungsten vaporizes and tungsten atoms are released inside the bulb. The released tungsten atoms bond with the halogen atoms inside the bulb to form halogenated tungsten and float inside the bulb. If the bulb inner wall is an appropriate temperature, then the halogenated tungsten circulates by convection and returns to the electrodes without adhering to the bulb inner wall. The halogenated tungsten returning to the electrodes is separated by heat so that the tungsten atoms return to the electrodes and the halogen atoms float inside the bulb. The recurrence of this reaction is called a halogen cycle.

Because of this cycle, wear of the tungsten electrodes is alleviated and blackening resulting from tungsten adhering to the bulb inner wall is controlled. Incidentally, when the temperature of the bulb inner wall is too low, the halogenated tungsten adheres to the bulb inner wall, and when the temperature of the bulb inner wall is too high, the halogenated tungsten separates at the bulb inner wall and the tungsten atoms adhere to the bulb inner wall. For that reason, it is necessary to maintain the temperature of the bulb inner wall within an appropriate temperature range in order for the halogen cycle to be appropriately performed.

In HID lamps that utilize the halogen cycle in this manner, there is the problem that when the input power is adjusted in order to control the amount of light of the lamp, the temperature of the bulb inner wall also changes in response to the power, and when the temperature of the bulb inner wall is outside the appropriate range, the halogen cycle cannot be performed appropriately and the lifespan of the lamp becomes shorter. Consequently, the adjustable power range becomes limited when the temperature of the inner wall of the bulb is set in the appropriate range.

Through an experiment by the inventors in the present case, it was found that the adjustable range of power in an ultra high pressure mercury lamp with a rating of 150 W is 110 to 190 W when the temperature of the bulb is set in the temperature range that lamp manufacturers prescribe as a condition for use. Because the amount of light of a lamp is virtually dependent on power, the dimming range is 60 to 100%. With a dimming range of this extent, the effect of improving the contrast ratio is small, so there are few advantages to be put to practical use with this method alone.

SUMMARY OF THE INVENTION

It is a first object of the present invention to provide a projection display whose maximum luminance and contrast ratio can be increased without increasing the power consumption of a light source.

It is a second object of the present invention to provide a projection display with a wide dimming range without shortening the lifespan of a lamp.

The present invention provides a projection display that uses a light modulating device to modulate, in accordance with image data, light radiated from a light source, project the modulated light onto a screen, and display an image. The projection display separates a unit of time configuring the image data into an effective light time when the light modulating device can express the light as an image on the screen and an ineffective light time when the light modulating device cannot express the light as an image on the screen. The projection display increases the power supplied to the light source during the effective light time over the power supplied to the light source during the ineffective light time.

Further, assuming that P represents the average power supplied to the light source in one frame of the image data, P1 represents the supplied power during the effective light time, P2 represents the supplied power during the ineffective light time, T1 represents the percentage of the effective light time t1 within one frame, and T2 represents the percentage of the ineffective light time t2, then the projection display of the present invention is configured to dynamically change T1, P1, T2, and P2 to satisfy $T1 \cdot P1 + T2 \cdot P2 = P \cdot (T1+T2)$.

According to this invention, a projection display whose maximum luminance and contrast ratio are large and whose dimming range is wide can be realized without shortening the lifespan of the light source and without increasing the cost.

The foregoing and other objects, features, aspects, and advantages of the present invention will become more apparent from the following detailed description of the present invention when taken in conjunction with the accompanying drawings.

BRIEF DESCRIPTION OF THE DRAWINGS

Exemplary embodiments of the present invention will be described in detail with reference to the following figures, wherein.

DETAILED DESCRIPTION OF THE INVENTION

First Exemplary Embodiment

Figure 1:
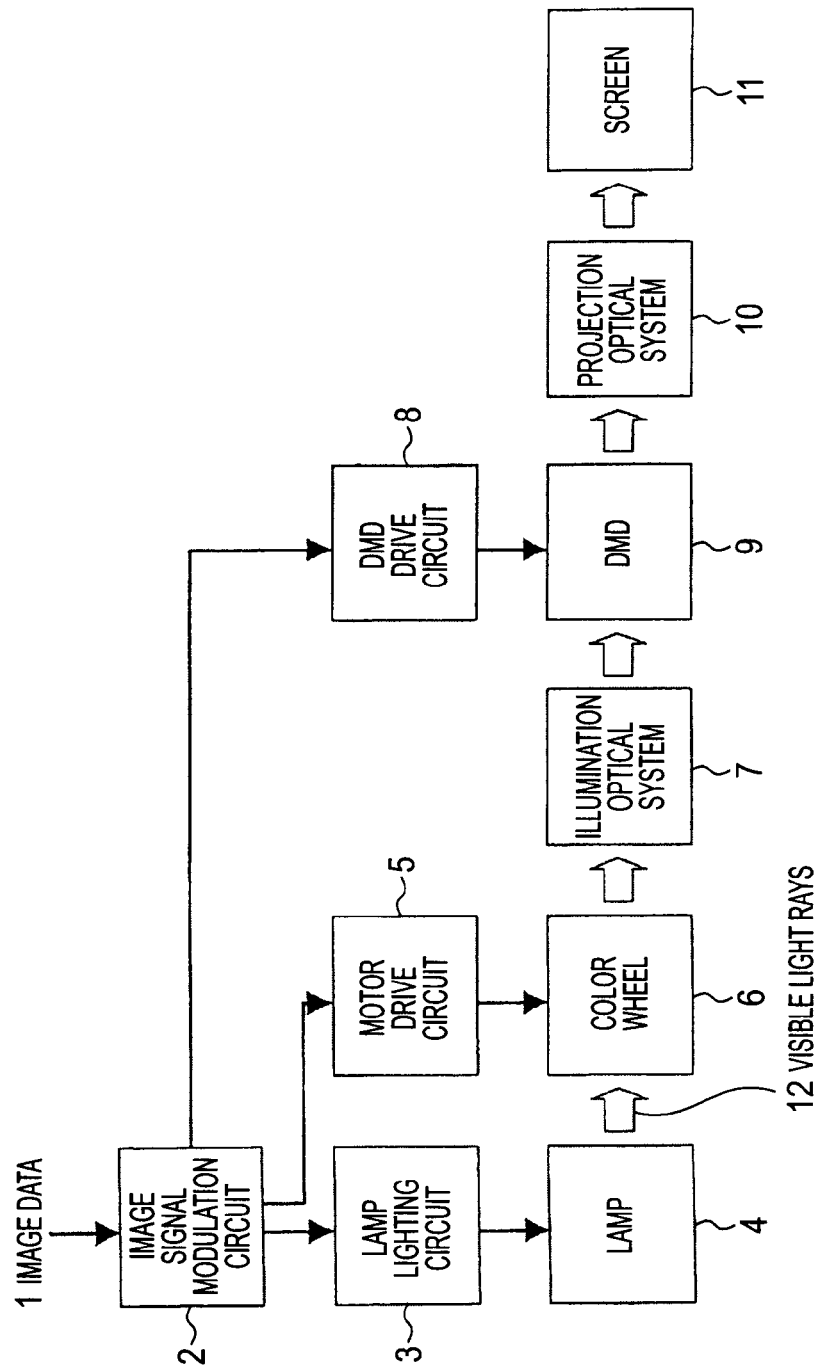
FIG. 1 is a system configuration diagram of a projection display showing a first exemplary embodiment of the invention.

FIG. 1 is a system diagram of a projection display in a first exemplary embodiment of the present invention. In the present exemplary embodiment, a Digital Light Processing (DLP, registered trademark of Texas Instruments, Inc.) projection display will be described as the projection display. A DLP is a projection display that uses a DMD as a light modulating device.

In FIG. 1, an image signal modulation circuit 2 modulates inputted image data 1, sends the data to a DMD drive circuit 8, and also sends a synchronizing signal to a lamp lighting circuit 3 and a motor drive circuit 5.

The lamp lighting circuit 3 inputs a later-described specific power waveform to a lamp 4 serving as a light source to cause the lamp 4 to radiate visible light rays 12. The lamp 4 is, for example, an ultra high pressure mercury lamp, which is an HID lamp.

Figure 2:
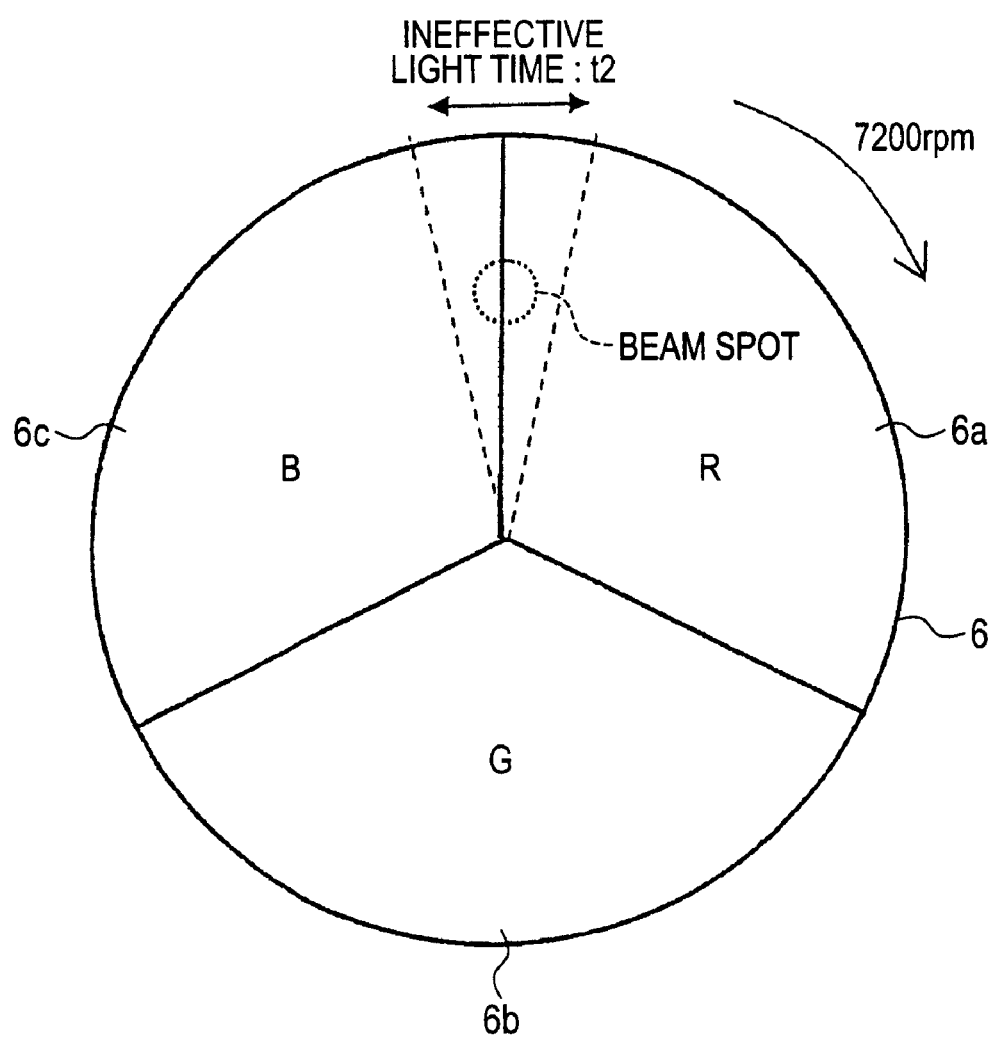
FIG. 2 is a diagram showing a color wheel in the first exemplary embodiment of the invention.

As shown in FIG. 2, a color wheel 6 is configured by a red transmission filter 6a, a green transmission filter 6b, and a blue transmission filter 6c, and is rotated at a constant number of revolutions by the motor drive circuit 5 that is driven in accordance with the synchronizing signal from the image signal modulation circuit 2. Here, an example is described where the color wheel 6 is divided into the three colors of red, green, and blue, but there are also examples where the color wheel is time-divided into six colors that further include cyan, magenta, and yellow, and the color wheel 6 is not limited to time-divided wavelengths. The light radiated from the lamp 4 passes through the color wheel 6, whereby the light is sequentially temporally separated into light of red, green, and blue wavelengths and made incident on a DMD 9 via an illumination optical system 7.

The light radiated from the lamp 4 is focused at the point where it passes through the color wheel 6, but because the beam spot diameter is finite, a mixed color area arises when the light moves from the color filter of a certain color to the color filter of the next color. Consequently, basically the light during that time is not used for an image. During the time in which the light from the lamp 4 is passing through the mixed color area—that is, the time in which the boundary line between a color filter of the color wheel 6 and another color filter adjacent thereto and the light from the lamp 4 overlap—the DMD 9 is always switched OFF regardless of the image data 1 to ensure that the light is not projected onto a screen 11. The boundary line between a color filter and another color filter is called a spoke.

Further, using the spoke as a central axis, the time in which the DMD 9 is always switched OFF regardless of the image data 1—that is, the time in which a light modulating device cannot express the light from a light source as an image on a screen—is called an ineffective light time and will be represented by t2 as a signal. On the other hand, the time in which the DMD 9 is switched ON and OFF and grayscale display is being performed in accordance with the image data 1—that is, the time in which a light modulating device can express light from a light source as an image on a screen—is called an effective light time and will be represented by t1 as a signal.

It will be noted that the time in which the boundary line between a color filter of a color wheel and another color filter adjacent thereto and the light from a light source overlap is included in the ineffective light time t2.

The DMD 9, which is a light modulating device, comprises plural micromirror devices two-dimensionally arrayed on a semiconductor substrate and performs light modulation as a result of the inclination of each of the micromirror devices being changed by the DMD drive circuit 8. The angle of inclination takes two values: an ON state where the micromirror devices project light onto the screen 11 via a projection optical system 10 and an OFF state where the micromirror devices do not project light onto the screen 11. Grayscale display becomes possible by switching each of the micromirror devices ON and OFF in accordance with image data with respect to a unit of time (called a sub-field) temporally weighted by a factor of 2. For example, when 256 shades of gray are to be produced, the sub-field is weighted by $2^0, 2^1, 2^3, 2^4, 2^5, 2^6, 2^7$ and $2^8$. Eight sub-fields are allocated within an allocation time for each color within one frame.

Figure 3:
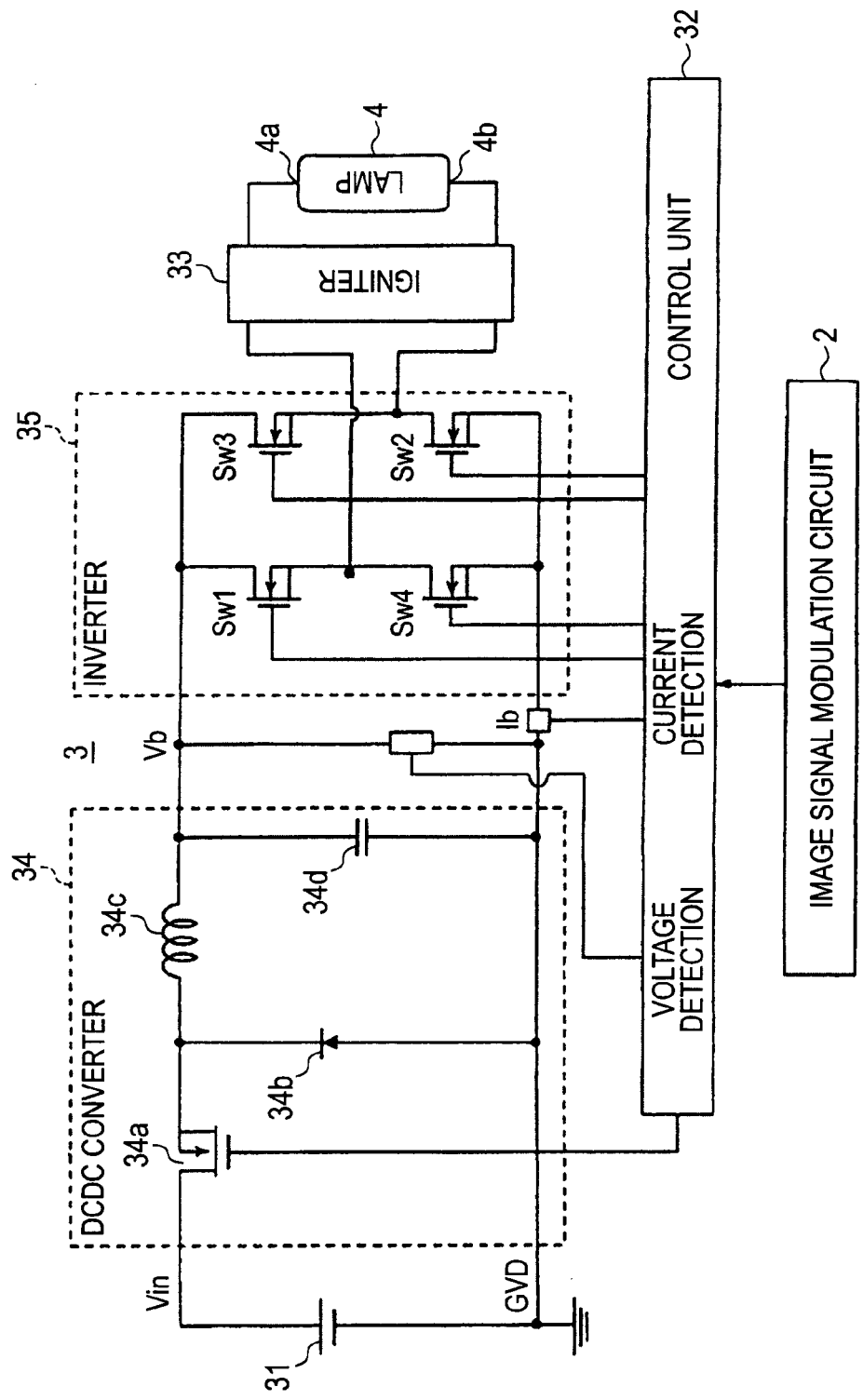
FIG. 3 is a circuit diagram of a lamp lighting circuit in the first exemplary embodiment of the invention.

FIG. 3 is a circuit diagram of the lamp lighting circuit 3 in the first exemplary embodiment. The lamp lighting circuit 3 is configured by a DC power supply 31, a DCDC converter 34, an inverter 35, an igniter 33, and a control unit 32. The DCDC converter 34 is a chopper type buck converter configured by a switch 34a comprising a MOSFET, a diode 34b, a reactor 34c, and a capacitor 34d. When a DC voltage Vin is applied to the DCDC converter 34 from the DC power supply 31, the DCDC converter 34 converts the DC voltage Vin to a predetermined DC voltage Vb. The DC voltage Vin is a DC voltage where a commercial AC voltage is full-wave rectified and thereafter boosted.

The inverter 35 is a full-bridge inverter configured by switches SW1 to SW4 comprising MOSFETs. The inverter 35 converts, to an alternating current rectangular wave, the DC voltage Vb converted by the DCDC converter 34 and applies the alternating current rectangular wave voltage to electrodes 4a and 4b on both ends of the lamp 4. The igniter 33 is connected between the inverter 35 and the lamp 4 in order to perform initial startup of the lamp 4, and applies to the electrodes 4a and 4b of the lamp 4 a voltage that the lamp 4 is capable of breaking when the lamp 4 is initially started up. The control unit 32 houses a microcomputer (not shown) that detects the DC voltage Vb and a current Ib and uses the detected voltage and current to calculate the power being consumed by the lamp 4 at the time of detection. The control unit 32 controls the frequency and duty of the switch 34a of the DCDC converter 34 such that any difference between the calculated power and a target power retained beforehand in a table disappears. The power detected here and the target power are values averaged in the time of one frame (1/60 sec) or more. Because of this control, the power consumed by the lamp is averagely held at a constant so that the average amount of light and the temperature of the lamp can be held at a constant.

The control unit 32 also controls the frequency and duty of the switch 34a of the DCDC converter 34 such that the power waveform supplied to the lamp 4 becomes a later-described desired power waveform on the basis of the synchronizing signal from the image signal modulation circuit 2 while holding the average power consumed by the lamp at a constant.

Figure 4:
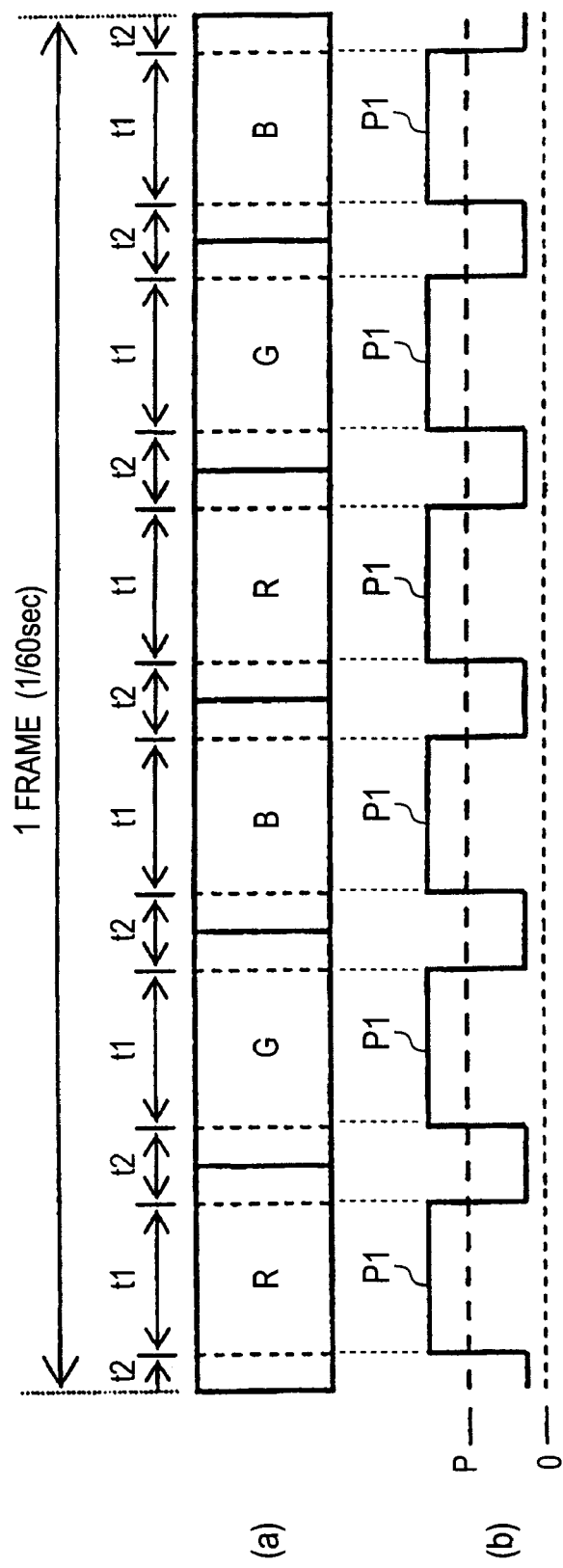
FIG. 4 is an explanatory diagram showing time sequences of a color wheel within one frame and a power waveform supplied to a lamp showing the first exemplary embodiment of the invention.

FIG. 4 shows the relationship between a time sequence (a) of the color wheel 6 and a time sequence (b) of the power waveform supplied to the lamp 4.

The power waveform (b) is outputted with respect to the time sequence (a) of the color wheel 6 always at the same timing shown in FIG. 4 by the control unit 32 on the basis of the synchronizing signal from the image signal modulation circuit 2. Here, the power waveform supplied to the lamp 4 is shown, but because the light output of the lamp 4 is substantially proportional to the power supplied to the lamp 4, the supplied power waveform of (b) may also be thought of as representing the waveform of the light output.

Here, P represents the average power supplied to the lamp 4 in one frame of the image data 1, P1 represents the power supplied during the effective light time t1, and P2 represents the power supplied during the ineffective light time t2.

Whereas in a conventional device P=P1=P2 because there is no difference between the power supplied during the effective light time and the power supplied during the ineffective light time through one frame and the values are constant, in the device of the present invention, the average power P supplied to the lamp 4 within one frame is constant, but the power P1 supplied during the effective light time t1 becomes greater than the power P2 supplied during the ineffective light time t2. That is, in the device of the first exemplary embodiment of the present invention, assuming that T1 represents the percentage of the effective light time t1 within one frame of the image data and that T2 represents the percentage of the ineffective light time t2 within one frame, then the relationship between P, P1, and P2 is set so as to satisfy the following expression.

$$T1 \cdot P1 + T2 \cdot P2 = P \cdot (T1 + T2)$$

$$P1 > P2$$

Next, action where the maximum luminance and the contrast ratio rise according to the device of the present invention will be described in comparison to a conventional device. Assuming that $L_{max}$ represents the maximum luminance, $L_{min}$ represents the minimum luminance, L1 represents DMD-incident luminance in the effective light time, L2 represents DMD-incident luminance in the ineffective light time, $R_{on}$ represents the reflectance when the DMD is ON, and $R_{off}$ represents the reflectance when the DMD is OFF, then the following expressions are established.

$$L_{max} \cdot (T1+T2) = L1 \cdot T1 \cdot R_{on} + L2 \cdot T2 \cdot R_{off}$$

$$L_{min} \cdot (T1+T2) = L1 \cdot T1 \cdot R_{off} + L2 \cdot T2 R_{off}$$

Contrast ratio $= L_{max}/L_{min} : 1$

First, as a comparison, it will be assumed that in both devices, reflectance when the DMD is ON is 90%, reflectance when the DMD is OFF is 0.1%, T1 is 75%, and T2 is 25%.

In the conventional device, P=P1=P2, so L=L1=L2. Here, L is the incident luminance on the DMD averaged in one frame. The maximum luminance, the minimum luminance, and the contrast ratio become as follows.

$$L_{max} = L \cdot 0.75 \cdot 0.9 + L \cdot 0.25 \cdot 0.001 = 0.675 \cdot L$$

$$L_{min} = L \cdot 0.75 \cdot 0.001 + L \cdot 0.25 \cdot 0.001 = 0.001 \cdot L$$

Contrast ratio=675:1

In contrast, in the device of the present invention, the most extreme difference is when P1=4/3·P and P2=0, and supposing this case, L1=4/3·L and L2=0. The maximum luminance, the minimum luminance, and the contrast ratio become as follows.

$$L_{max}=4/3 \cdot L \cdot 0.75 \cdot 0.9 = 0.9 \cdot L$$

$$L_{min}=4/3 \cdot L \cdot 0.75 \cdot 0.001 = 0.001 \cdot L$$

Contrast ratio=900:1

Thus, it will be understood that in the device of the first exemplary embodiment of the present invention, the maximum luminance increases 4/3 times and the contrast ratio increases 4/3 times with respect to the conventional device.

According to the above configuration, a projection device whose maximum luminance and contrast ratio can be increased without increasing the power consumption of the light source can be realized.

Second Exemplary Embodiment

Figure 5:
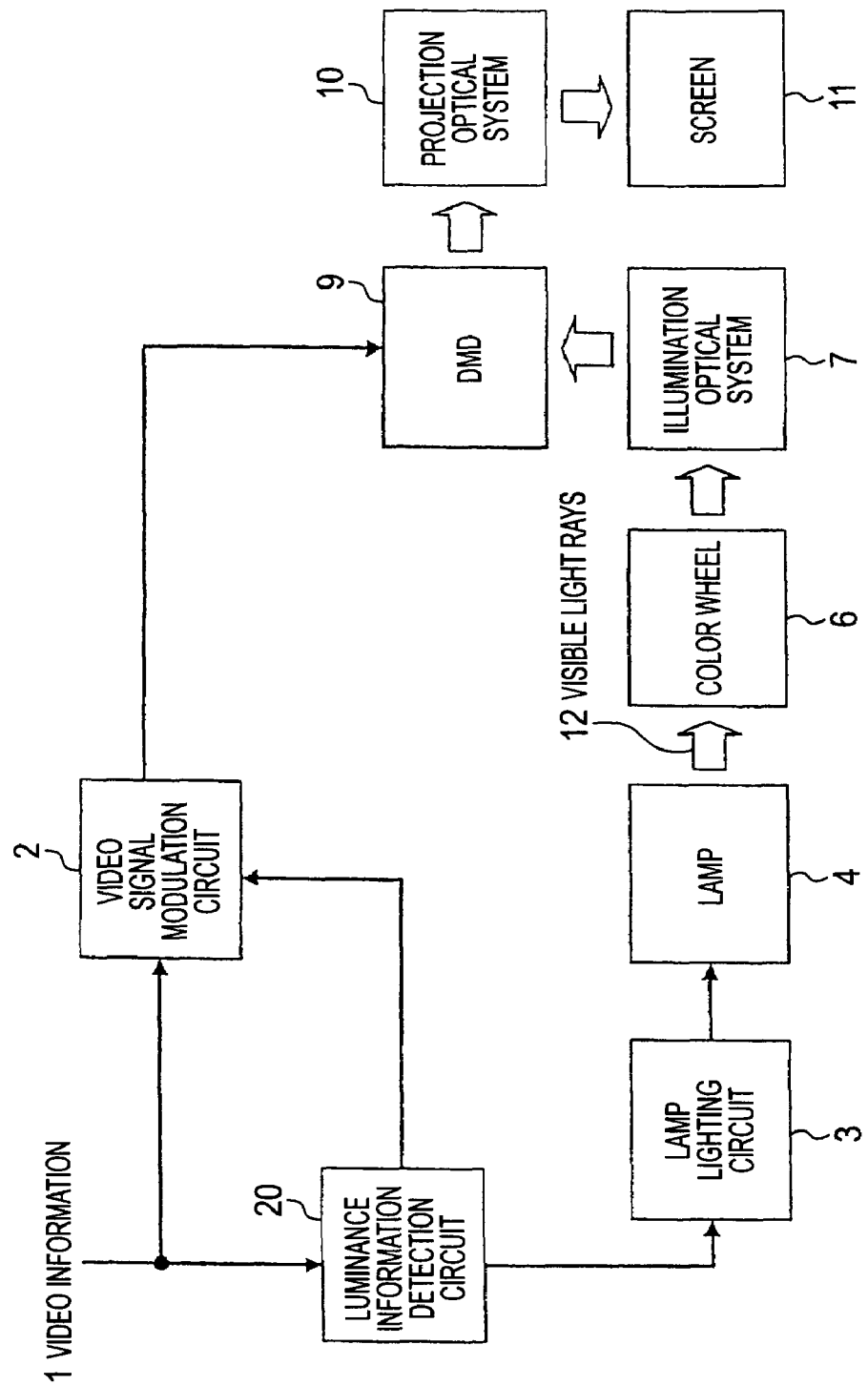
FIG. 5 is a system configuration diagram of a projection display in a second exemplary embodiment of the invention.

FIG. 5 shows a system configuration diagram of a projection display in a second exemplary embodiment of this invention, and the same reference numerals except 1 and 2 show portions that are the same as those in FIG. 1. What is different from the first exemplary embodiment is that here the projection display includes a luminance information detection circuit 20 that extracts luminance information from video information 1, and the luminance information detection circuit 20 outputs this luminance signal to a video signal modulation circuit 2 and the lamp lighting circuit 3. It will be noted that illustration of the motor drive circuit 5 that is driven in accordance with a synchronizing signal from the video signal modulation circuit 2 is omitted. The luminance information detection circuit 20 detects characteristics of luminance information on the basis of the video information 1 inputted from video information inputting means (not shown), digitalizes the characteristics as luminance information, and outputs the characteristics every frame (1/60 sec). The characteristics of the luminance information detected by the luminance information detection circuit 20 may be the average luminance or the peak luminance. Further, characteristics of luminance information obtained using another algorithm may also be used.
The video signal modulation circuit 2 modulates the video information 1 on the basis of the inputted video information 1 and the luminance information detected by the luminance information detection circuit 20 and creates a drive voltage to be applied to the DMD 9 that is a light modulating device. The lamp lighting circuit 3 that is light source lighting means inputs a power waveform corresponding to the luminance information digitalized by the luminance information detection circuit 20 to the lamp 4 that is a light source to cause the lamp 4 to emit the visible light rays 12. The visible light rays 12 are time-divided by the color wheel 6 into red light, green light, and blue light having predetermined wavelengths and projected onto the screen 11 via the illumination optical system 7, the DMD 9, and the projection optical system 10 to become video, which is the same as what was described in the first exemplary embodiment. It will be noted that the lamp 4 is, for example, an ultra high pressure mercury lamp, which is an HID lamp.

Figure 6:
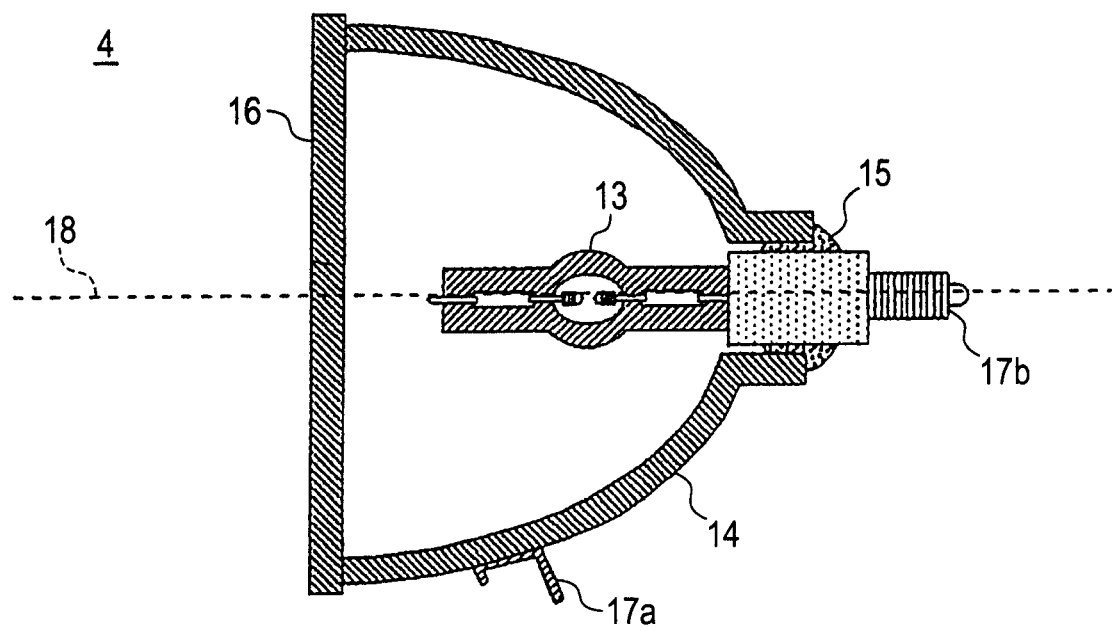
FIG. 6 is a cross-sectional diagram of an ultra high pressure mercury lamp used in the invention.

FIG. 6 shows a cross-sectional diagram of the ultra high pressure mercury lamp. The lamp 4 is configured by a bulb 13 and a reflector 14. The bulb 13 is configured by a tungsten electrode and a discharge space filled with mercury and a halogenated metal. A sealant 15 seals the bulb 13 and the reflector 14. Electrodes 17a and 17b are for applying a voltage to the bulb 13. The visible light rays 12 discharged by arc discharge inside the bulb 13 are reflected by the reflector 14, pass through a front glass 16, are focused in one point on a light axis 18 of the lamp 4, and made incident on the color wheel 6 of FIG. 5.

Description of the configuration and operation of the lamp lighting circuit 3 are substantially the same as the description based on FIG. 3 in the first exemplary embodiment, so it will be omitted here.

Figure 7:
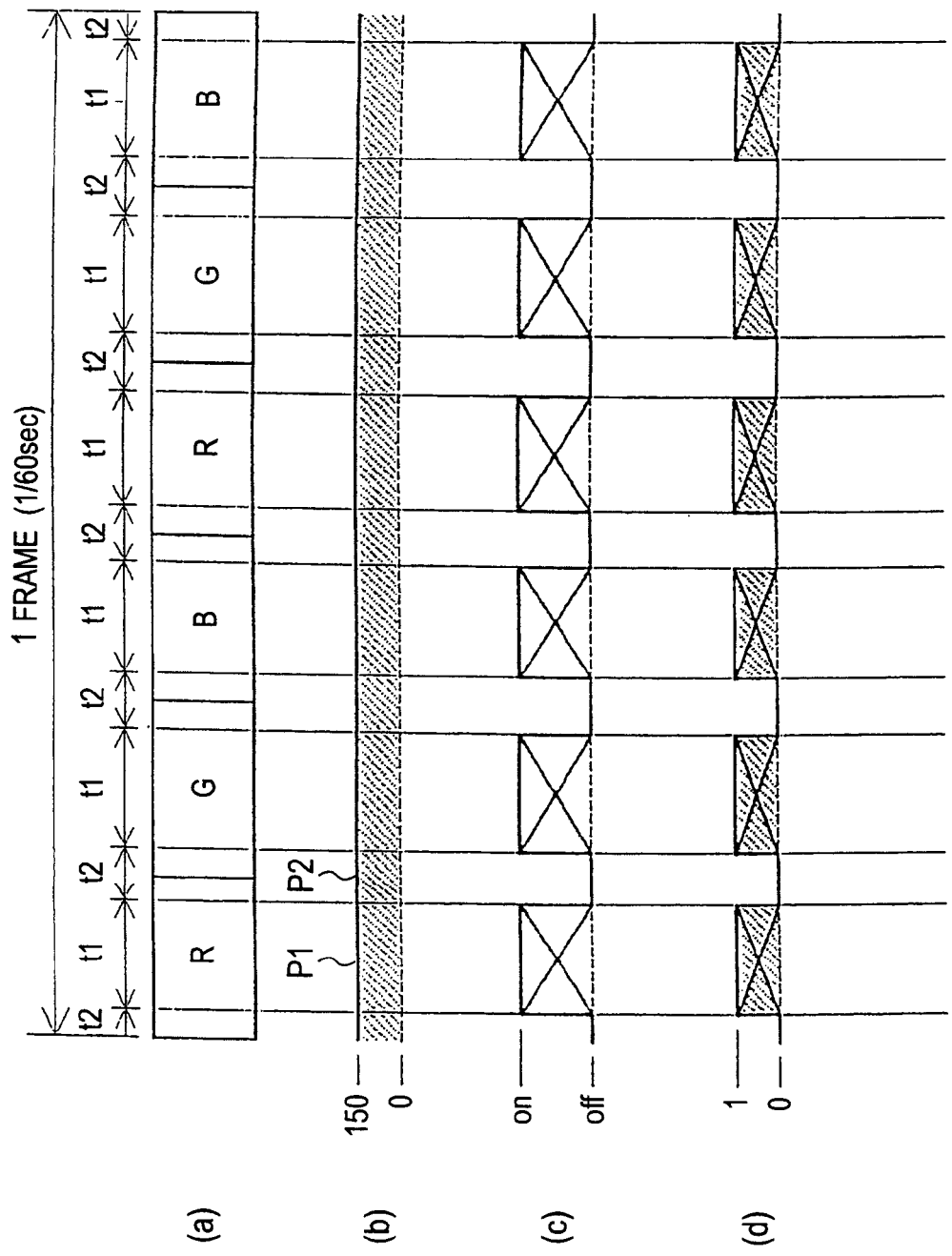
FIG. 7 is an example of a diagram describing the details of dimming action of the projection display in the second exemplary embodiment of the invention, and shows a time sequence of a color wheel within one frame, a time sequence of a power waveform within one frame, a time sequence of a DMD within one frame, and a time sequence of light output within one frame.
Figure 8:
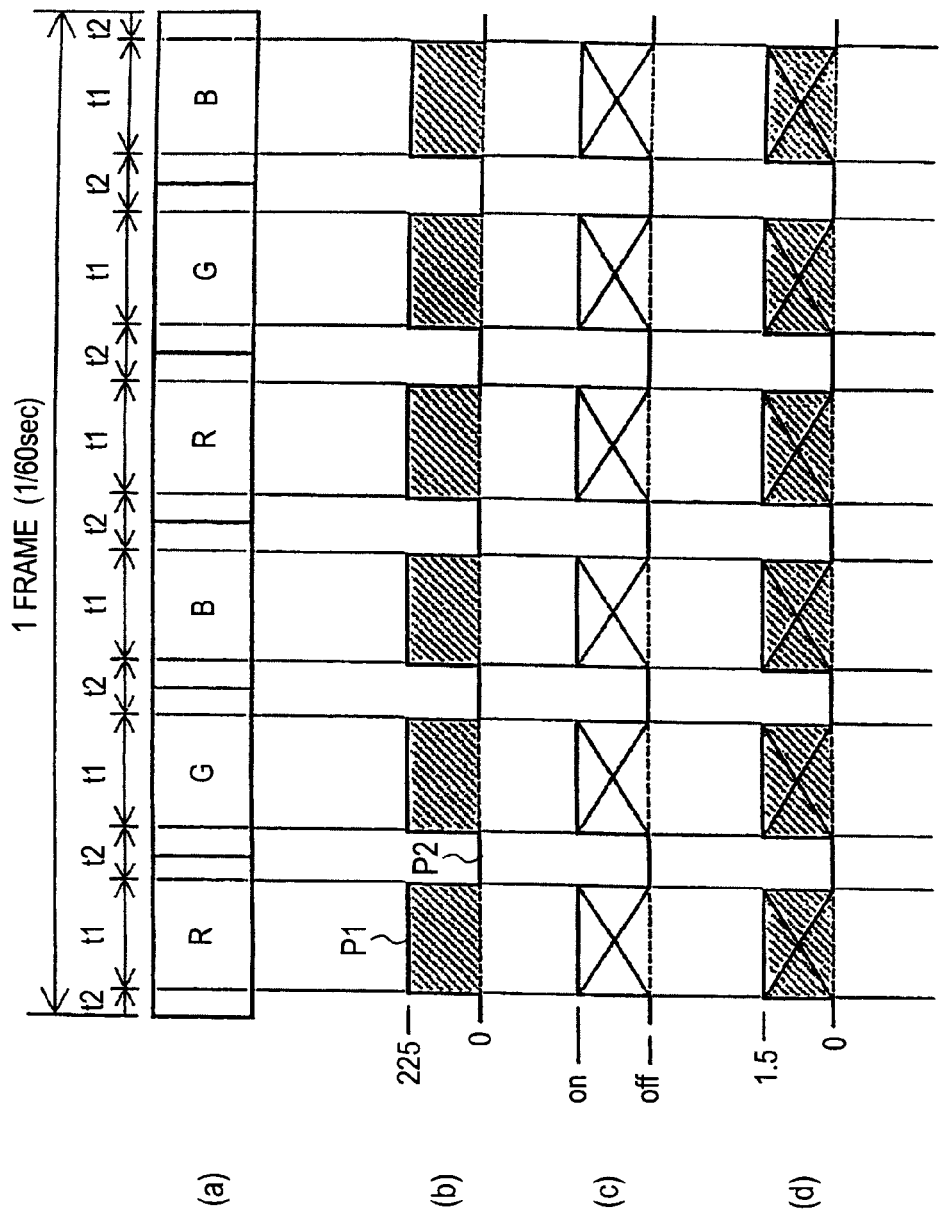
FIG. 8 is similarly a diagram describing the details of the dimming action of the projection display in the second exemplary embodiment of the invention, and shows an example of a pattern that outputs maximum luminance.
Figure 9:
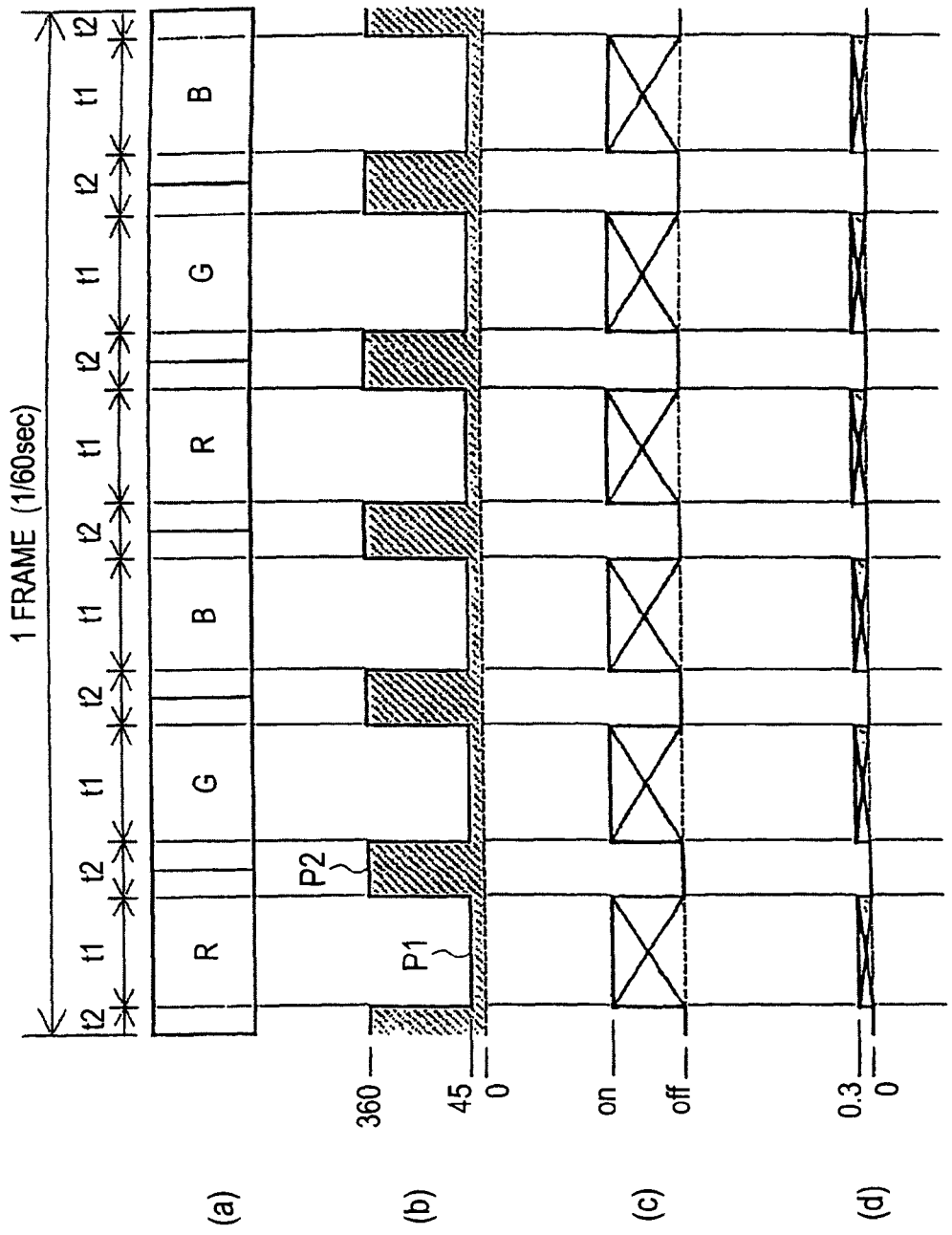
FIG. 9 similarly shows an example of a pattern that outputs minimum luminance.

Next, the details of dimming action of the projection display in the second exemplary embodiment of this invention will be described using FIG. 7 to FIG. 9. In FIG. 7 to FIG. 9, which show the relationship between the power waveform of the lamp 4, the ON and OFF timing of the DMD 9, and the output of the light, (a) shows the time sequence of the color wheel 6 within one frame. As shown in FIG. 2, when the color filter of the color wheel 6 is divided into three and rotates at a rotational speed of 7,200 rpm, the filters become time-divided as in (a) when this is represented as a time sequence. Further, (b) shows a time sequence of the power waveform within one frame, (c) shows a time sequence of the DMD within one frame, and (d) shows a time sequence of the light output within one frame.

As shown in the time sequence of the DMD of (c), one frame is divided into effective light times t1 and ineffective light times t2. In the present exemplary embodiment, it is supposed that t1:t2=2:1, but this ratio is a value that should be adjusted by the target dimming range. In the power waveform of (b), P1 [W] represents the power during the effective light times t1 within one frame, and P2 [W] represents the power during the ineffective light times t2.

FIG. 7 shows a case where P1=P2=150 [W], and the average power in one frame is also 150 W. The power pattern of (b) is flat but becomes the light output pattern of (d) because of the ON and OFF sequence of the DMD of (c). The integral value of the light output of the effective light times t1 becomes the effective luminance on the screen 11.

FIG. 8 shows a case where P1=225 W and P2=0 W in a pattern for outputting the maximum luminance. The average power in one frame is the same 150 W as FIG. 5. The power pattern of (b) becomes the light output pattern of (d) because of the sequence of the DMD of (c). The light output during the effective light times t1 is 1.5 times that of FIG. 7.

FIG. 9 shows a case where P1=45 W and P2=360 W in a pattern for outputting the minimum luminance. The average power is the same 150 W as FIG. 7. The power pattern of (b) becomes the light output pattern of (d) because of the sequence of the DMD of (c). The light output during the effective light times t1 is 0.3 times that of FIG. 5.

The control patterns shown in FIG. 7 to FIG. 9 are all values where the average power falls within the temperature range of the light source determined by the specifications of the light source. Moreover, assuming that T1 represents the percentage of the effective light times t1 within one frame of the image data and that T2 represents the percentage of the ineffective light times t2 within one frame, P1 and P2 are dynamically changed every one frame or every several frames in accordance with the luminance information such that the average power P becomes T1·P1+T2·P2=P·(T1+T2).

Figure 10:
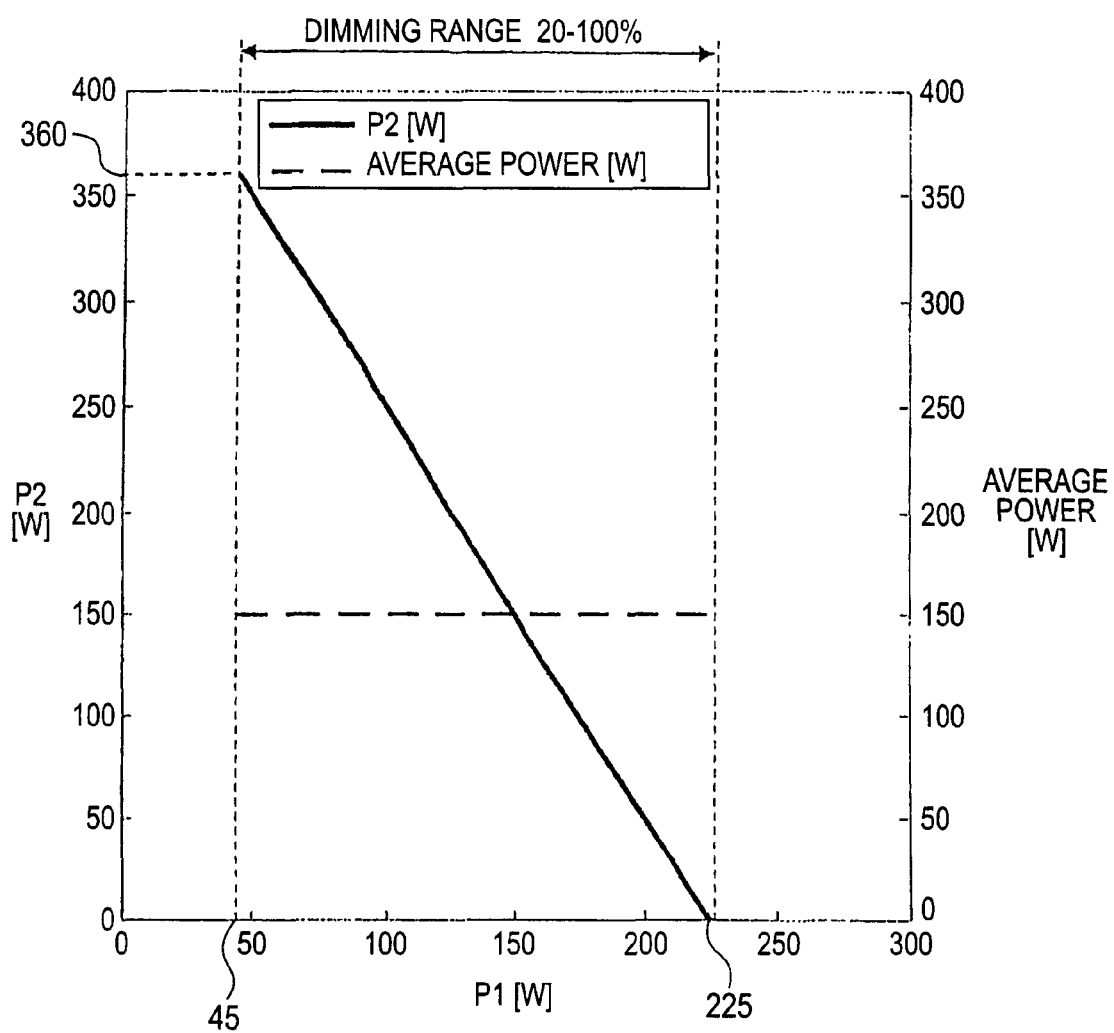
FIG. 10 shows the relationship between power P1 and power P2 and the relationship between power P1 and average power in the second exemplary embodiment of the invention.

FIG. 10 is a graph in which the results of FIG. 7 to FIG. 9 are compiled. The bold solid line represents the relationship between the power P1 and the power P2, and the bold dotted line represents the relationship between the power P1 and the average power. This shows that P1 can be changed from 45 W to 225 W under the constant condition of an average power of 150 W. In principle, P1 can be changed from 0 W to 225 W, but here the minimum value of the power P1 is 45 W for the following reason.

In order to output, even instantaneously, power that is greater than the average power, it is necessary for the parts configuring the lighting circuit to be parts that handle greater power, which results in increases in the cost and size of the lighting circuit. For that reason, it is necessary to control increases in the cost and size of the lighting circuit by disposing an upper limit on the instantaneous power. In the lighting circuit of the present exemplary embodiment, the upper limit on the instantaneous power is 360 W. For that reason, the minimum value of P1 is 45 W. Thus, the adjustable range of P1 is 45 W to 225 W, and because the amount of light of the lamp is substantially proportional to the power, a dimming range of 20 to 100% becomes possible.

Further, ordinarily the constant power waveform of 150 W shown in FIG. 7(b) is used in a lamp with a rating of 150 W. In the present exemplary embodiment, because the lamp power is concentrated on the effective light times t1, the maximum luminance can be raised in comparison to when the power is fixed at 150 W. It will be understood that in the present exemplary embodiment, when FIG. 8 is compared with FIG. 7, the maximum luminance can be increased by 1.5 times.

According to the above configuration, by making the temperature of the light source a temperature at which the halogen cycle can be appropriately performed, the power P1 of the effective light times t1 can be adjusted without shortening the lifespan of the light source, so the dimming range can be widened. Using this light source system, a projection display whose contrast ratio and maximum luminance are improved without increasing the cost can be realized.

Third Exemplary Embodiment

In the second exemplary embodiment, the power P1 is adjusted under the condition that the average power is constant in order to keep the temperature of the lamp at a constant. Incidentally, as long as the temperature of the lamp is within the use temperature range of the lamp, the halogen cycle works appropriately even if the average power is changed somewhat, so the lifespan of the lamp is not adversely affected. In the lamp with a rating of 150 W described here, the average power that can be adjusted without going out of the use temperature range of the lamp was 110 W to 190 W. In the third exemplary embodiment, instead of the control described in the second exemplary embodiment that keeps the average power at a constant, means that adjusts the power P1 by changing the average power in a range where the halogen cycle of the lamp is appropriately conducted—that is, in the use temperature range of the lamp—will be described.

Figure 11:
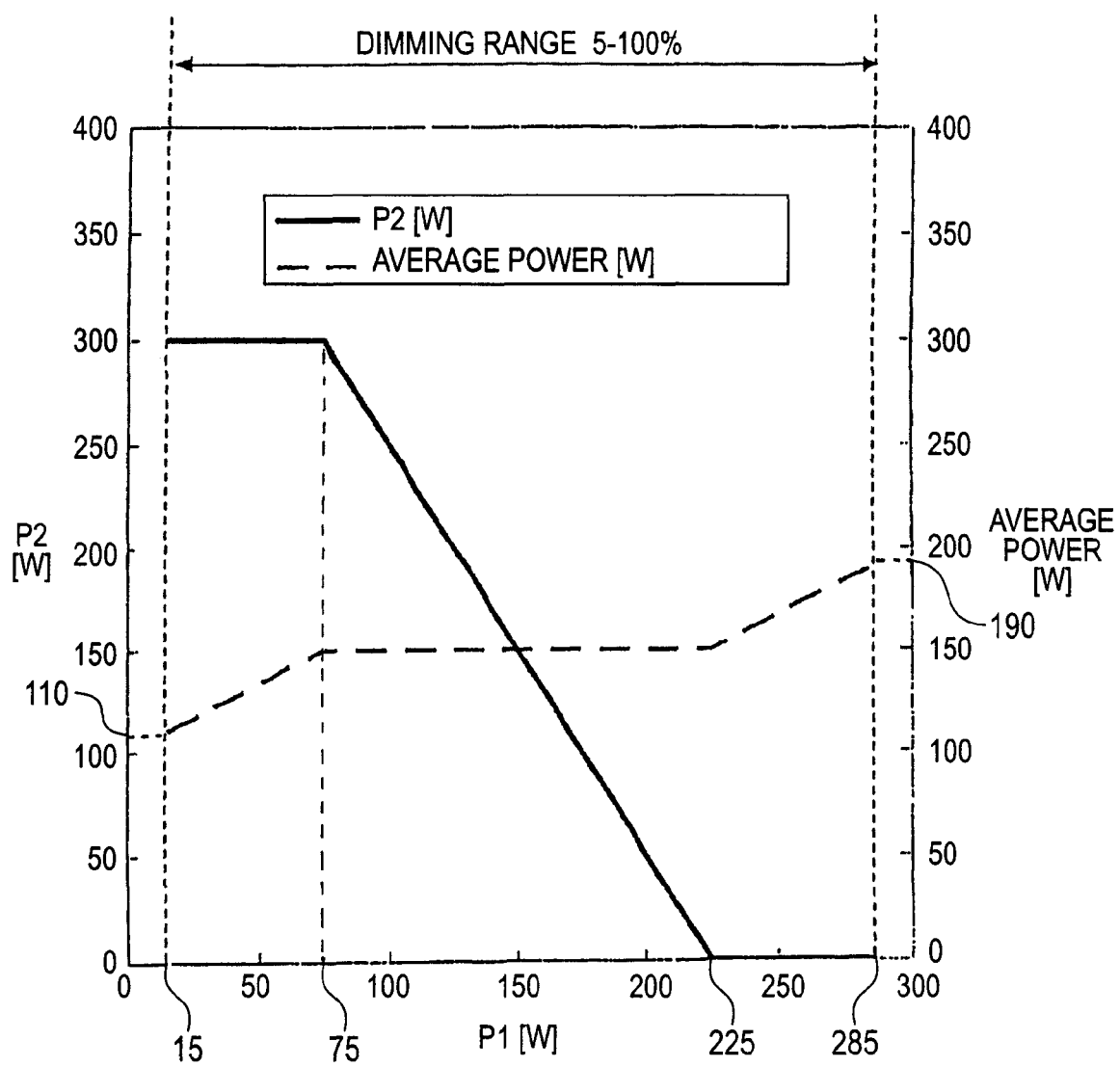
FIG. 11 shows the relationship between power P1 and power P2 and the relationship between power P1 and average power in a third exemplary embodiment of the invention.

In FIG. 11, the bold solid line represents the relationship between the power P1 and the power P2, and the bold dotted line represents the relationship between the power P1 and the average power. When the lower limit of P2 is set to 0 W and the upper limit is set to 300 W, the range of P1 is 75 W to 225 W. When P1 is set to 75 W or lower, P2 becomes a constant at the upper limit of 300 W and causes the average power to decrease. When P1 is set to 225 W or higher, P2 becomes a constant at the lower limit of 0 W and causes the average power to increase. The times when the power reaches the lower limit of 110 W and the upper limit of 190 W of the average power are the minimum value and the maximum value of the power P1. In FIG. 11, the minimum value of the power P1 is 15 W and the maximum value is 285 W, and dimming of 5 to 100% is possible.

According to the above configuration, a light source system whose dimming range is wide and whose maximum luminance is large can be realized without shortening the lifespan of the light source, so using this light source system, a projection display whose contrast ratio and maximum luminance are improved without increasing the cost can be realized.

Further, because the adjustable range of P1 can be widened by adjusting the average power, the upper limit of the instantaneous power of the lighting device of the lamp can be lowered, and a lighting circuit that is compact and inexpensive can be created.

Fourth Exemplary Embodiment

Figure 12:
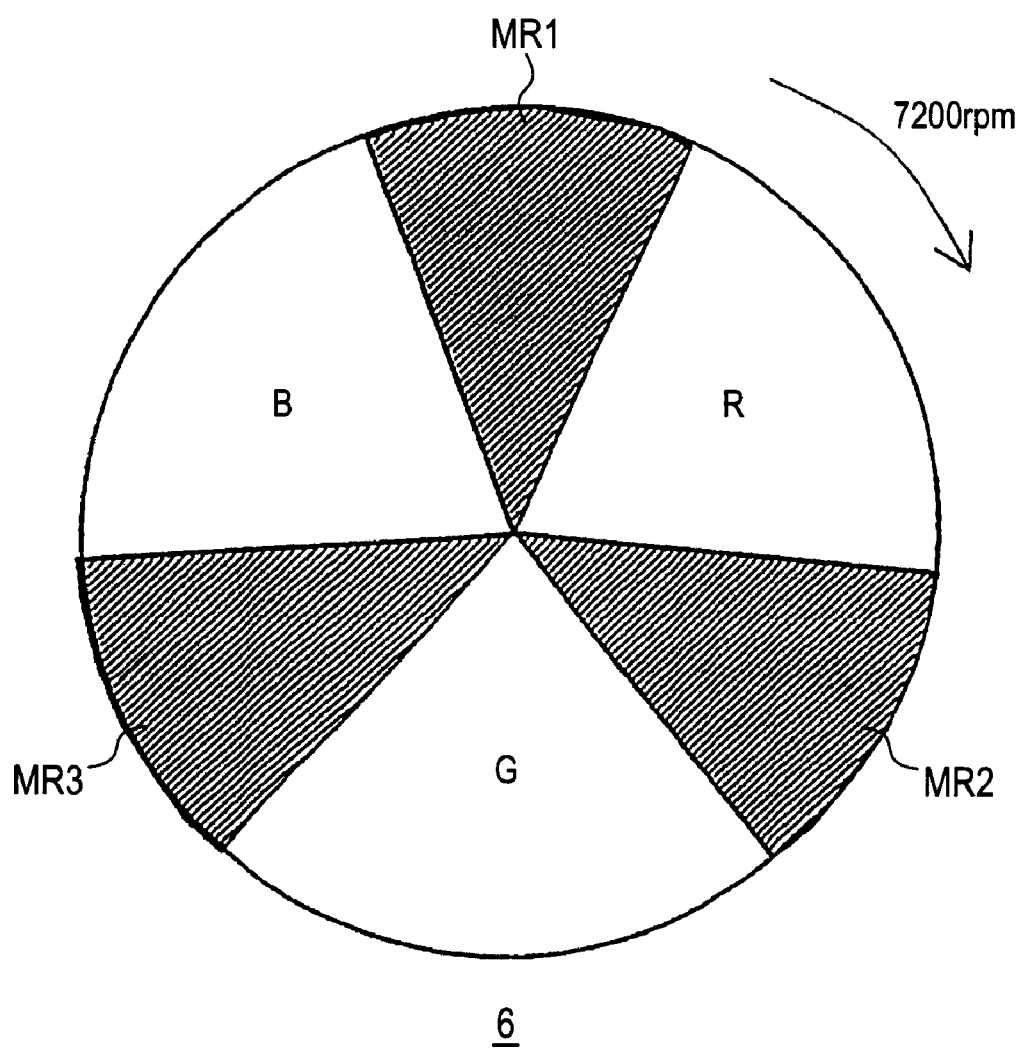
FIG. 12 shows a color wheel in a fourth exemplary embodiment of the invention.

FIG. 12 is a diagram showing a color wheel in a fourth exemplary embodiment for implementing the present invention. Further, in FIG. 13, (a) shows a time sequence of the color wheel 6 within one frame, (b) shows a time sequence of the power waveform within one frame, (c) shows a time sequence of the DMD 9 within one frame, and (d) shows a time sequence of the light output within one frame, for implementing the present invention. In the second and third exemplary embodiments, the DMD 9 is switched OFF during the times of t2 to ensure that light does not reach the screen. However, even when the DMD 9 is switched OFF, a little light reaches the screen, becomes luminance bias, and causes the contrast ratio to drop. The light of this bias is called stray light.

Figure 13:
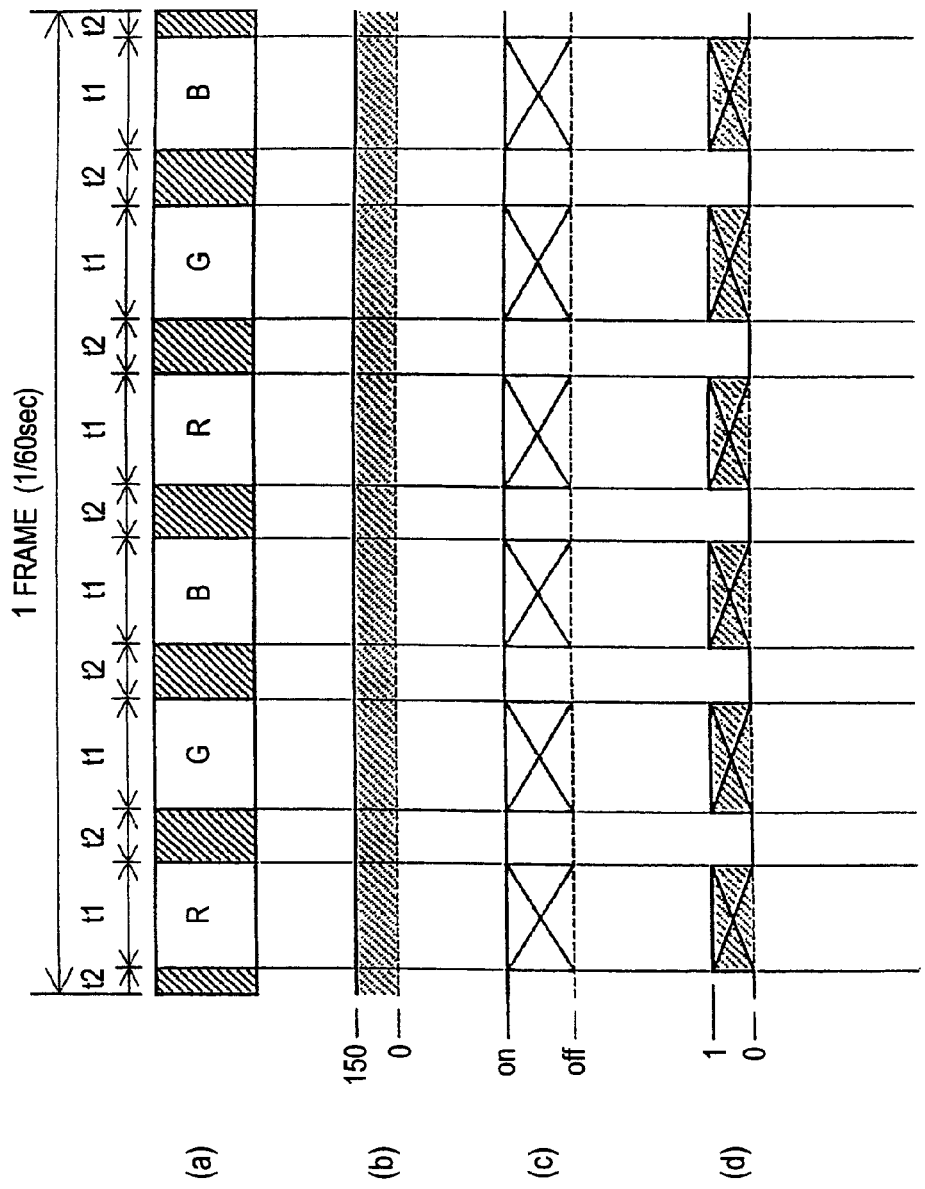
FIG. 13 is an example of a luminance pattern in the fourth exemplary embodiment of the invention, and shows a time sequence of the color wheel within one frame, a time sequence of a power waveform within one frame, a time sequence of a DMD within one frame, and a time sequence of light output within one frame.

In the fourth exemplary embodiment, mirrors MR1 to MR3 that reflect light are disposed in the color wheel 6. MR1 to MR3 are disposed in a constant width including a boundary line between a predetermined color filter and another color filter adjacent thereto. The areas of the mirrors correspond to the ineffective light time t2. The light radiated from the lamp 4 is reflected by the mirrors during the times of t2, and the reflected light returns to the light emission point of the lamp. For that reason, during the times of t2, the light does not reach the DMD 9 and does not reach the screen 11 as stray light. In FIG. 13, the DMD 9 is ON during the times of t2, but it is also conceivable for the mirrors to transmit even a little light, so switching the DMD 9 OFF can reduce the amount of stray light.

Figure 14:
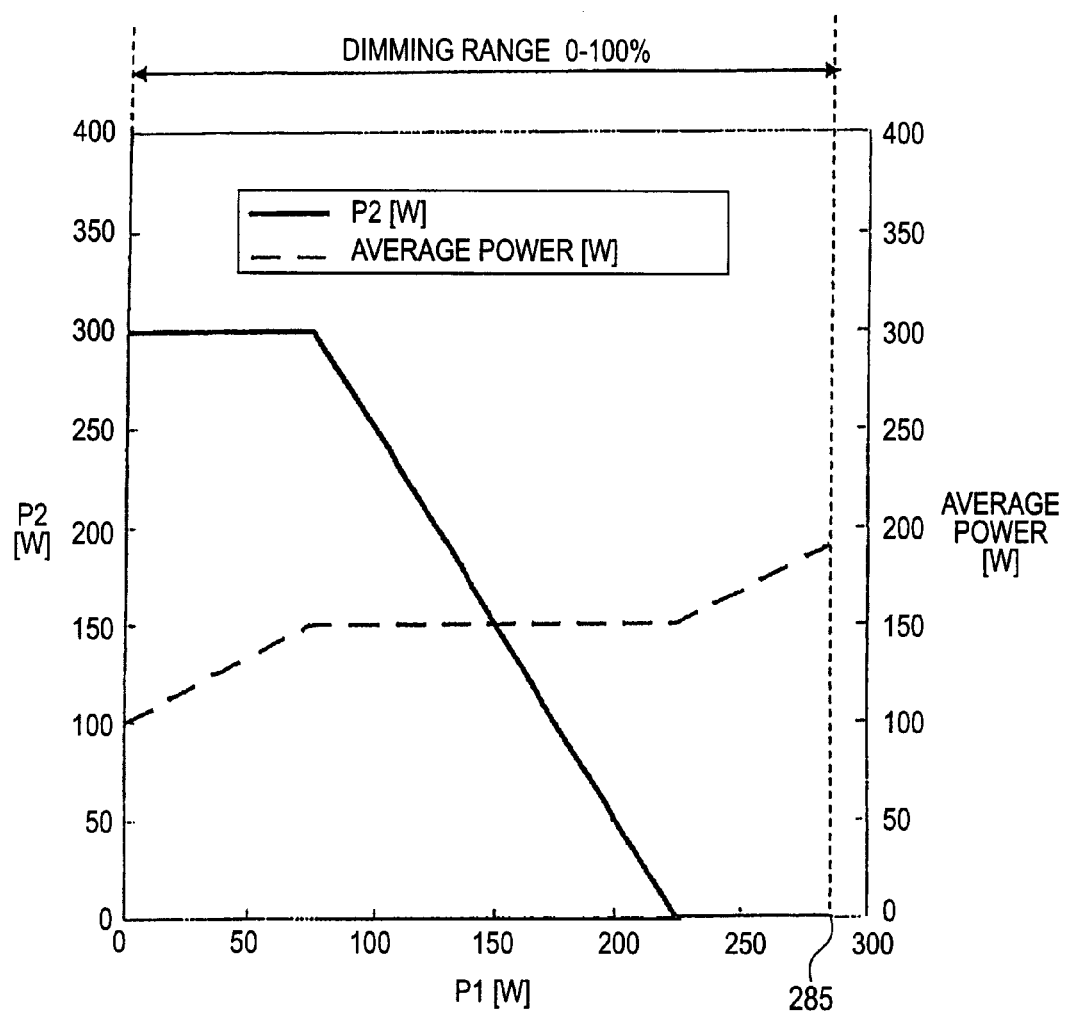
FIG. 14 shows the relationship between power P1 and power P2 and the relationship between power P1 and average power in the fourth exemplary embodiment of the invention.

Further, in the fourth exemplary embodiment, the value of the lower limit of the average power when the average power is lowered is determined by the lower limit of the temperature of the lamp. In a mode that lowers the average power, the amount of light reflected by the mirrors in the times of t2 is large, and the amount of light that returns to the light emission point of the lamp also becomes large. The lamp temperature rises because of the energy of the light returning to the lamp. As a result, the value of the lower limit of the average power determined by the lower limit of the temperature of the lamp becomes lower. For example, because of the returning light, supposing that the value of the lower limit of the average power is 100 W, then as shown in FIG. 14, the minimum value of P1 becomes 0 W, the maximum value of P1 becomes 285 W, and dimming of 0 to 100% becomes possible. It suffices as long as the mirrors MR are mirrors whose transmittance of light is low; for example, the mirrors MR may be white plates or black plates. However, because black plates absorb light, it is necessary to sufficiently devise a heat countermeasure, and since there is not returning light, there is no effect of raising the temperature of the lamp.

As described above, according to this fourth exemplary embodiment, stray light can be controlled because light during the ineffective light times t2 is not transmitted by the color wheel 6. Further, when a substance whose reflectance is high is used, the temperature of the lamp can be raised by the energy of the reflected light, so the lower limit of the adjustable range of the power can be lowered and the dimming range can be widened. It will be noted that, although specific numerical values were given for the average power and instantaneous power of the lamp and for the configuration and number of rotations of the color filters of the color wheel in the second to fourth exemplary embodiments, it goes without saying that the present invention can also be applied to lamps of any rating and any color wheel as long as the basic thinking is the same.

Various modifications and alterations of this invention will be apparent to those skilled in the art without departing from the scope and spirit of this invention, and it should be understood that this is not limited to the illustrative embodiments set forth herein.

What is claimed is:

1. A projection display comprising:
   video information inputting means that inputs video information;
   luminance information detecting means that detects characteristics of luminance information of the input video information and that outputs luminance information digitalized on the basis of the input video information;
   a light source;
   light source lighting means that outputs a power waveform to cause the light source to light in accordance with the luminance information obtained by the luminance information detecting means; and
   a light modulating device that receives light radiated from the light source and modulates the light in accordance with the video information and the luminance information to perform video display,
   wherein in order to adjust the amount of light with which the light can be expressed as video on a screen, the light source lighting means separates a unit of time configuring the video into an effective light time t1 in which the light modulating device can express the light as video on a screen and an ineffective light time t2 in which the light modulating device cannot express the light as video on a screen, and
   assuming that P1 represents the power supplied to the light source during the effective light time t1, P2 represents the power supplied to the light source during the ineffective light time t2, and average power P represents the power supplied to the light source averaged in the unit of time configuring the video, and assuming that T1 represents the percentage of the effective light time t1 within one frame of the video information and that T2 represents the percentage of the ineffective light time t2 within one frame, the light source lighting means dynamically changes T1, P1, T2, and P2 every one frame or every plural frames in accordance with the luminance information detected by the luminance information detecting means such that the average power P becomes $$T1 \cdot P1 + T2 \cdot P2 = P \cdot (T1 + T2).$$

2. The projection display according to claim 1, wherein the average power P is a fixed value.

3. The projection display according to claim 1, wherein the average power P is variable in a range where a halogen cycle of the light source is appropriately conducted.

4. The projection display according to claim 1, wherein the projection display further includes, between the light source and the light modulating device, a color wheel that time-divides the light from the light source into predetermined wavelengths, and a time when the light from the source light overlaps a boundary line between a predetermined color filter configuring the color wheel and another color filter adjacent thereto is included in the ineffective light time t2.

5. The projection display according to claim 1, wherein a substance whose transmittance is low with respect to the light from the light source is arranged in the color wheel at a constant width including a boundary line between a predetermined color filter and another color filter adjacent thereto.

* * * * *